(12) United States Patent
Van Noland

(10) Patent No.: US 7,081,206 B2
(45) Date of Patent: Jul. 25, 2006

(54) FILTER APPARATUS AND METHOD WITH CENTRIFUGAL SEPARATOR FOR REMOVING CONTAMINANTS FROM A FLUID

(75) Inventor: Milton Charles Van Noland, Grass Valley, CA (US)

(73) Assignee: Investors Precision Manufacturing, Inc., Stockton, CA (US)

( * ) Notice: Subject to any disclaimer, the term of this patent is extended or adjusted under 35 U.S.C. 154(b) by 259 days.

(21) Appl. No.: 10/630,947

(22) Filed: Jul. 30, 2003

(65) Prior Publication Data

US 2004/0099595 A1 May 27, 2004

Related U.S. Application Data

(60) Provisional application No. 60/400,419, filed on Jul. 31, 2002.

(51) Int. Cl.
| | |
|---|---|
| *B04B 1/02* | (2006.01) |
| *B04B 9/06* | (2006.01) |
| *B04B 1/10* | (2006.01) |
| *B01D 21/26* | (2006.01) |
| *B01D 33/15* | (2006.01) |
| *B01D 33/01* | (2006.01) |
| *C02F 1/38* | (2006.01) |
| *B01D 35/00* | (2006.01) |

(52) U.S. Cl. ............... 210/787; 210/781; 210/780; 210/360.1; 210/360.2; 210/378; 210/380.1; 494/49; 494/43; 494/46; 494/53

(58) Field of Classification Search ............ 494/49
See application file for complete search history.

(56) References Cited

U.S. PATENT DOCUMENTS

| | | | |
|---|---|---|---|
| 4,024,062 A | * 5/1977 | Holthuis | 210/219 |
| 4,640,772 A | 2/1987 | Graham | |
| 6,423,225 B1 | 7/2002 | Wong et al. | |
| 6,709,575 B1 | * 3/2004 | Verdegan et al. | 210/108 |

* cited by examiner

*Primary Examiner*—John Kim
*Assistant Examiner*—Krishnan S. Menon
(74) *Attorney, Agent, or Firm*—Richard A. Ryan

(57) ABSTRACT

The filter removes volatile, particulate and water-based contaminants from a fluid, such as lubricating oil, of a different density than the contaminants. The device has a cone shaped, jet-propelled, helical-spiral wiper rotor creating centrifugal forces that separate the volatile and heavier particulate matter. Ports in a base assembly facilitate removal of the separated contaminants. A settling tank with vertical grid filter minimizes turbulence for further separation of heavier particulate matter. A volatile tank with vertical grid filter and flow restrictor minimizes turbulence to allow volatiles to rise from the fluid. A filter tank filters out remaining particulate matter from the fluid. A combination of flow restrictors and baffles minimize cross-contamination, thereby maximizing purity of oil returned to the engine. The collection tanks are easily cleaned and reused. The compact design minimizes oil volume necessary for purification. Aluminum housing and by-pass design maximize engine oil cooling to enhance viscosity maintenance.

45 Claims, 8 Drawing Sheets

FILTER APPARATUS AND METHOD WITH CENTRIFUGAL SEPARATOR FOR REMOVING CONTAMINANTS FROM A FLUID

CROSS-REFERENCE TO RELATED APPLICATIONS

This application claims the benefit of U.S. Provisional Application No. 60/400,419 filed Jul. 31, 2002.

BACKGROUND OF THE INVENTION

A. Field of the Invention

The field of the present invention relates generally to apparatuses and methods for filtering fluid, such as oil from internal combustion engines, to remove particulate and liquid contaminants from the fluid. More particularly, the present invention relates to such apparatuses and methods which use centrifugal separators to separate liquid, corrosive, particulate and/or volatile contaminants from fluid and routing the contaminants into easily emptied collection tanks. Even more particularly, the present invention relates to such apparatuses and methods which utilize separate tanks or compartments to filter and store contaminants from the fluid.

B. Background

As is well known, internal combustion engines and other mechanical equipment and machines require lubrication of the moving components to prevent damage and premature wear to the engine or machine. Generally, engines and other machines have a lubrication fluid circulating system that coats the moving components with a thin layer of lubricant. During circulation of the lubricating fluid through the machine, the fluid is exposed to, absorbs and carries a variety of liquid, particulate and volatile contaminants. Because these contaminants can significantly reduce the ability of the lubricant to provide the required lubricating effect and, as a result be a hazard to engine life and performance and increase emissions from such engines, it is necessary to filter the lubricant to remove as much of the contaminants as possible in order to maintain lubrication purity. In motor vehicles and other equipment having internal combustion engines, the most common type of lubricant is oil and the most common filter is a full-flow filter that attaches to the oil pan or sump of the engine to remove contaminants from the flowing lubrication stream. Presently, the most widely accepted and utilized method of maintaining oil purity and quality in internal combustion engines is to frequently and periodically change, by removing and replacing, the oil and oil filter.

Although removing contaminated oil and filters is necessary and effective, replacing the oil and filter as a means to maintain oil quality has many drawbacks. The cost of replacing the oil and filters, as well as the labor involved, over the life of the engine or machine is considerable. In addition, other related expenses, in many industries, include hazardous waste removal costs and government fees and hazardous waste liability insurance. During the intervals between oil changes, contaminants are progressively building up in the oil, and during this time, can cause damage and increase emissions. Although the oil and filter are removed, much of the contamination is left in the crank case, as well as the bottom of the oil pan, to be circulated into the new oil when it is introduced into the system. Additionally, the effect of the new filter is limited, in that standard full-flow filters are designed to remove only the largest of particles and do little or nothing to remove other types of contaminants, such as water, corrosives, volatile contaminants and small particles, all of which are considered damaging to the life and performance of the engine. Based on this well known problem, the obvious solution would seem to be enhanced filtering of the oil during circulation through the engine.

Thus far, the market for enhanced filtering systems has not shown itself to be very broad. The expense associated with replacement of these filtering elements is one major issue, and the disposal of the rather large, used filter media is another. Also, these systems can easily become clogged with the contaminants they are configured to remove from the lubricating fluid. Although an improvement in lubrication fluid purity by these devices and methods has been demonstrated, they do not address the issue of volatile build-up in the oil, which can decrease viscosity. This is a major concern for the owner of an internal combustion engine who expects to run that engine on the same oil for any extended period of time, as the decrease in viscosity can lead to less effective lubrication. Insofar as these methods can keep oil cleaner, this benefit is of little value when the oil or other lubricating fluid being filtered loses viscosity, which oil and other lubricants are well known to do after extended periods of use at high temperatures (as found in internal combustion engines). The expense associated with the known enhanced filtering systems becomes difficult to justify, when taking into consideration the now viscosity-limited life of the oil, which is the original reason for utilizing the filtering system to keep it clean.

Many attempts have been made to bring to market less expensive and more efficient apparatuses for maintaining oil purity and quality in order to extend lubricating fluid life. Larger more dense filter media and disposable filters that last longer and increase purification have been proposed. Other forms of separation have been attempted and, in certain applications, have been cost effective improvements over previously used methods. One area which appears to be the most promising, for the purpose of extending the life of oil, is centrifugal separation. Patents have been granted for devices intended to remove contaminants from oil through centrifugal force. A couple of examples pertinent to the present invention are U.S. Pat. No. 6,423,225 to Wong et al and U.S. Pat. No. 4,640,772 to Graham.

The patent to Wong describes a liquid filter having a centrifugal separator with an annular filter element and a series of slanted fins at the main entrance to the housing which are intended to encourage the fluid travel in a specific direction, that being the outer walls of the filter housing, before the fluid travels through the filter element that is located at the center of the device. The filter is configured such that the heavier, separated contaminants are intended to move against the inside of the outer walls of the housing and accumulate at the bottom of the housing below the filter element. Although the device appears to be able to extend the life of the filter, by removing particles from the fluid to be filtered, it does not necessarily extend engine oil life as it provides no mechanism for removing volatiles from the lubricating fluid. Another limitation with this filter is the likely creation of turbulence within the filter, for which no solution or control is offered. Turbulence within the filter system results in the reintroduction of the contaminants to the flow of fluid, causing them to be returned to the general fluid circulation, which would tend to reduce the reduce the possibility of extended filter life.

The oil assembly detailed in the patent to Graham is also based on the concept of centrifugal force to separate contaminants from lubricating oil. This assembly seeks to create enough centrifugal force, through the use of a preferably disposable rotor, to separate the contaminants from the oil. As with the patent to Wong, however, the patent to Graham does not address the volatile issue, nor does it address the issue of turbulence control in order to prevent the reintroduction of contaminants to the oil. Another apparent limitation of this device is that the contaminants that are separated by being forced against the walls of the housing appear to only maintain their separation for as long as the rotor is kept turning. Because the rotor is kept turning by the circulation of the engine oil, the logical assumption is that upon turning the motor off, the sludge and other contaminants would run to the bottom of the unit. Unfortunately, the unit is designed to return oil from the bottom of the rotor directly back to the engine, and also bleed off to the filter element below, thereby reducing the effectiveness of all the rotor turning and separation of elements for oil purification and extension of filter life.

What is needed, therefore, is a relatively low cost, effective and easy to utilize apparatus and method for removing contaminates, including liquid, particulate and volatile contaminants, from a fluid, such as lubricating oil or any other fluid having particulate matter and/or one or more contaminating fluids of a different specific gravity than the clean fluid. The optimum solution would be a system that uses centrifugal separation, with specifically stratified and directed removal of all contaminants. This would allow for lighter volatile removal, as well as removal of water, corrosives and particulate matter. Such a system would also result in greatly extended filter life. Another requisite for such a device would be a system of pressure balances and baffles to control flow and turbulence within the filter. The preferred filter should also include one or more reusable, accessible collection tanks or compartments for ease in removal of each class of contaminant. Such as system would effectively serve as a compact, onboard refinery for the lubricating oil or other fluid.

SUMMARY OF THE INVENTION

The filter apparatus and method for removing contaminants from a fluid of the present invention provides the benefits and solves the problems identified above. That is to say, the present invention discloses an apparatus and method for removing liquid, corrosive, particulate and volatile contaminants from lubricating oil and other fluids. In accordance with a preferred embodiment of the present invention, the filter apparatus has a centrifugal separation system with a jet-propelled rotor that is powered by oil pressure from a source of contaminated oil, such as an internal combustion engine, to separate the heavier contaminants and lighter volatiles from the oil. Various flow restrictors and baffles are utilized to balance pressures. A chamber assembly having a plurality of reusable and accessible tanks collect the contaminants from the oil for ease in removal of each class of contaminant.

In one aspect of the apparatus of the present invention, the filter apparatus has an inlet configured to receive fluid from a source of pressurized fluid, such as the engine lubricating system on an internal combustion engine, into the filter apparatus and an outlet to discharge the fluid from the filter apparatus back to the engine. A centrifugal separator assembly having a rotor housing forming at least a portion of a rotor chamber and a rotor rotatably disposed inside the rotor chamber receives the fluid and imparts centrifugal forces to the fluid so as to separate one or more classes of contaminates, such as volatiles and heavier particulate matter, from the fluid. An upper bearing assembly and a lower bearing assembly, each having a rotor bearing and a bearing shaft, facilitate rotation of the rotor inside the rotor housing. A base assembly connected to the centrifugal separator assembly has a plurality of ports and passages to direct the fluid and different classes of contaminants to a chamber assembly having more than one chamber therein for receiving and filtering the fluid and classes of contaminates. The chamber assembly can have a settling chamber with a vertical grid filter for removing the heavier particulate matter from the fluid and a volatile chamber with a vertical grid filter for separating, without causing turbulence, the volatiles from the fluid. A filter chamber that has a filter disposed therein receives the remaining fluid and filters out the mid-range contaminants. The fluid separated from the heavier particulate matter is recycled back through the separator assembly for further processing. In the preferred configuration, the rotor is a generally conical shaped rotor having a helical, spiral wiper assembly for improved separation. Also in the preferred configuration, the rotor has one or more rotor jets thereon that utilize the pressure from the fluid to be filtered to rotate the rotor inside the rotor housing. The chambers can be removable tanks that are configured to allow disposal of the contaminates and for cleaning so as to allow reuse of the tanks. The materials selected for the filter apparatus and the by-pass design can provide additional engine oil cooling to further enhance viscosity of the oil.

In one aspect of the method of the present invention, the method includes the steps of receiving the fluid from a source of fluid (such as an internal combustion engine) into the filter, separating a portion of the contaminants in the fluid (such as the volatile and heavier particulate matter) from the fluid, selectively directing the separated materials through a base assembly to one or more chambers or tanks configured for processing like contaminates, filtering the separated materials in the chambers or tanks to further remove the contaminates from the fluid, and discharging the processed fluid from the filter apparatus back to the source of fluid.

Accordingly, the primary objective of the present invention is to provide a filter apparatus and method for removing contaminants from a fluid that provides the advantages described herein and that overcomes the disadvantages and/or limitations associated with presently available apparatuses and methods for filtering such contaminants.

It is also an important objective of the present invention to provide a filter apparatus that utilizes a centrifugal separator element to separate contaminants in a fluid into one or more tanks or compartments that prevent re-mixing or reintroduction of the contaminants into the filtered fluid.

It is also an important objective of the present invention to provide an improved filter apparatus and method to reduce the cost of replacing oil and other lubricating fluids by removing contaminants, including volatiles, from the lubricating fluid so as to maintain the fluid in a clean condition and maintain its viscosity.

It is also an important objective of the present invention to provide a filter apparatus and method to reduce the volume of hazardous waste product, hazardous waste disposal costs and the transportation of hazardous waste.

It is also an important objective of the present invention to provide a filter apparatus and method for reducing engine wear and emissions associated with the use of contaminated lubricating oil in an internal combustion engine.

It is also an important objective of the present invention to provide an improved apparatus and method of removing contaminants from a fluid that also provides additional engine oil cooling to reduce engine oil breakdown.

The above and other objectives of the present invention are explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiments of the present invention illustrated in the figures, the preferred embodiments of the present invention are set forth below. The enclosed figures and drawings are merely illustrative of the preferred embodiments, representing several different ways of configuring the present invention, and are not intended to be limiting. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
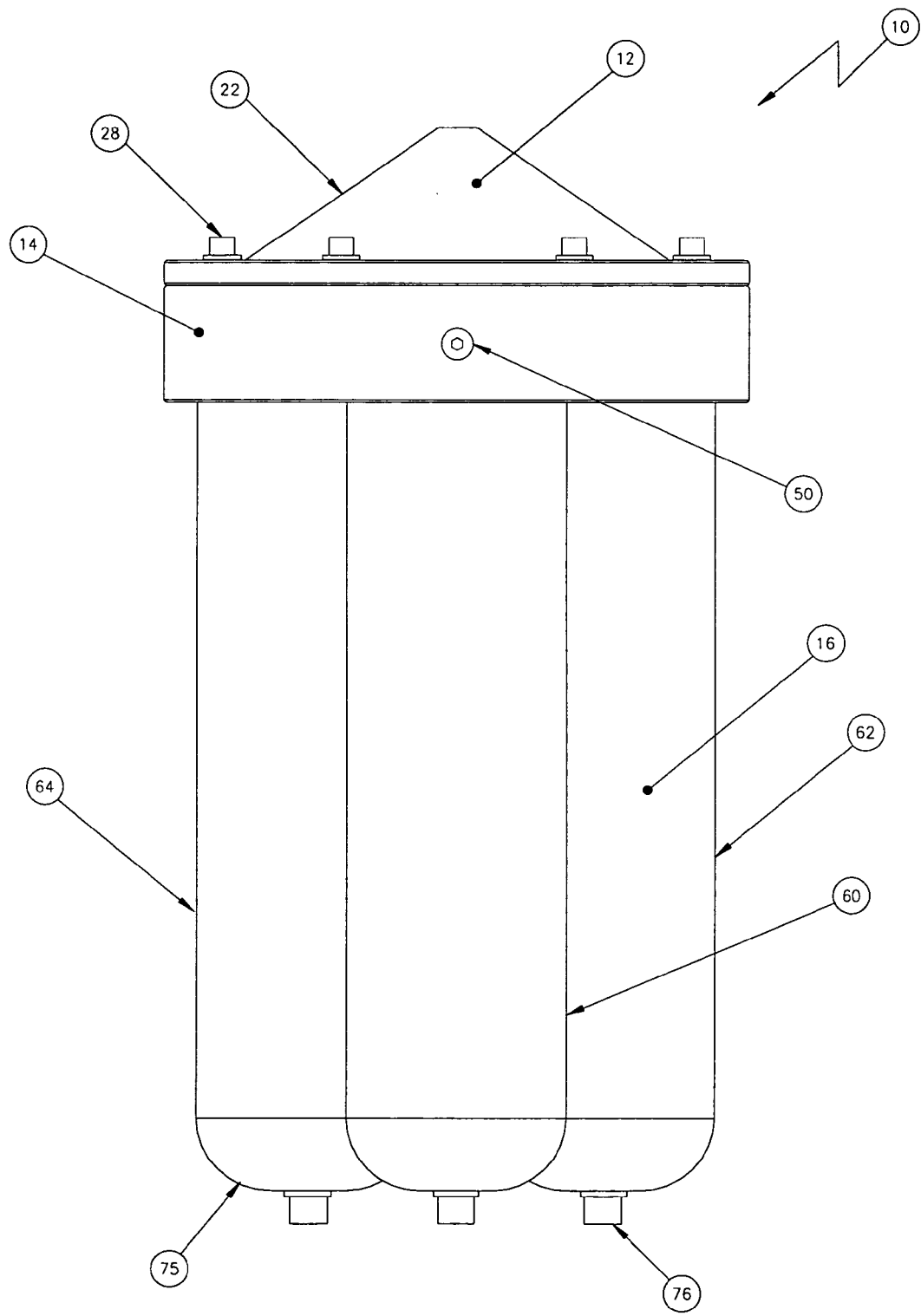
FIG. 1 is an exterior frontal view of the apparatus of the present invention primarily showing the housing for the apparatus and its primary components.
Figure 8:
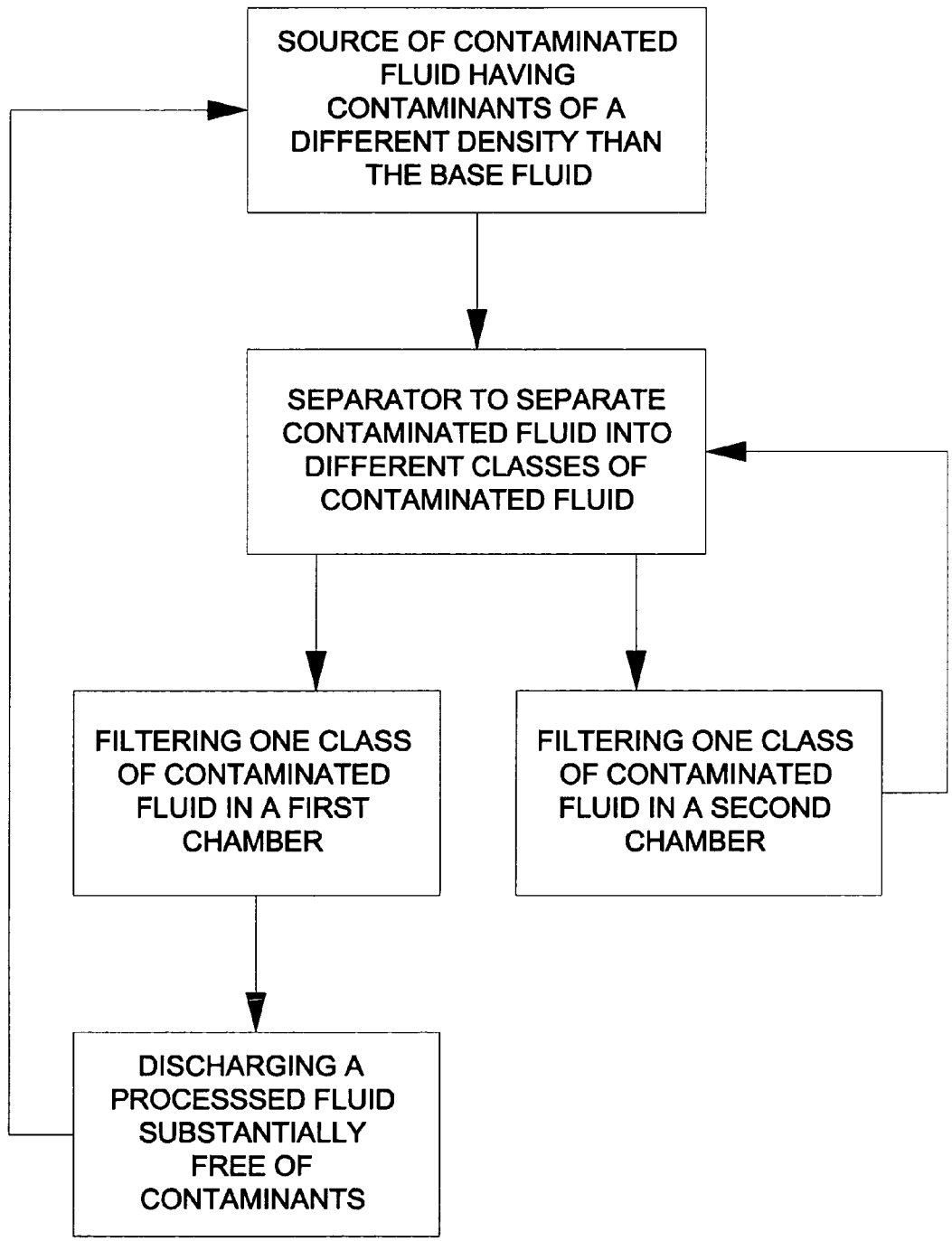
FIG. 8 is a circuit diagram of one embodiment of the present invention for removing contaminants from a fluid.

A preferred embodiment of the filter apparatus of the present invention, identified generally as 10 in the figures, primarily comprises centrifugal separator assembly 12, base assembly 14 and chamber assembly 16, as best shown in FIG. 1. As set forth in FIGS. 8 and 9, the filter apparatus 10 of the present invention is utilized with a source of fluid 18 contaminated with particulate matter and/or one or more fluid contaminates having a different specific gravity than that of fluid 18. The source of fluid 18 can include the oil lubricating system of an internal combustion engine, such as those used in motor vehicles, as well as other sources of contaminated fluid that, if cleaned, could be reused in the source from which it came. As set forth below, in the preferred embodiment of the filter apparatus 10 of the present invention, the source of fluid 18 is pressurized so as provide operational benefit to filter apparatus 10. For example, if the source of fluid 18 is an internal combustion engine, the oil pressure of the engine's lubricating system 20 is used to provide power to centrifugal separator assembly 12. The operation of filter apparatus 10 is based on the general principal that contaminants, fluid and/or solid, having different densities from that of the fluid to be cleaned can be separated from the fluid by centrifugal force. Once the centrifugal separator separates the contaminants from the fluid, the different classes of contaminants are directed into appropriately configured collection units in chamber assembly 16 for filtering of such contaminants. In the preferred embodiment, chamber assembly 16 is easily removed from filter apparatus 10 for disposing of the particulate and volatile materials and cleaning, as necessary or desired, chamber assembly 16.

Figure 9:
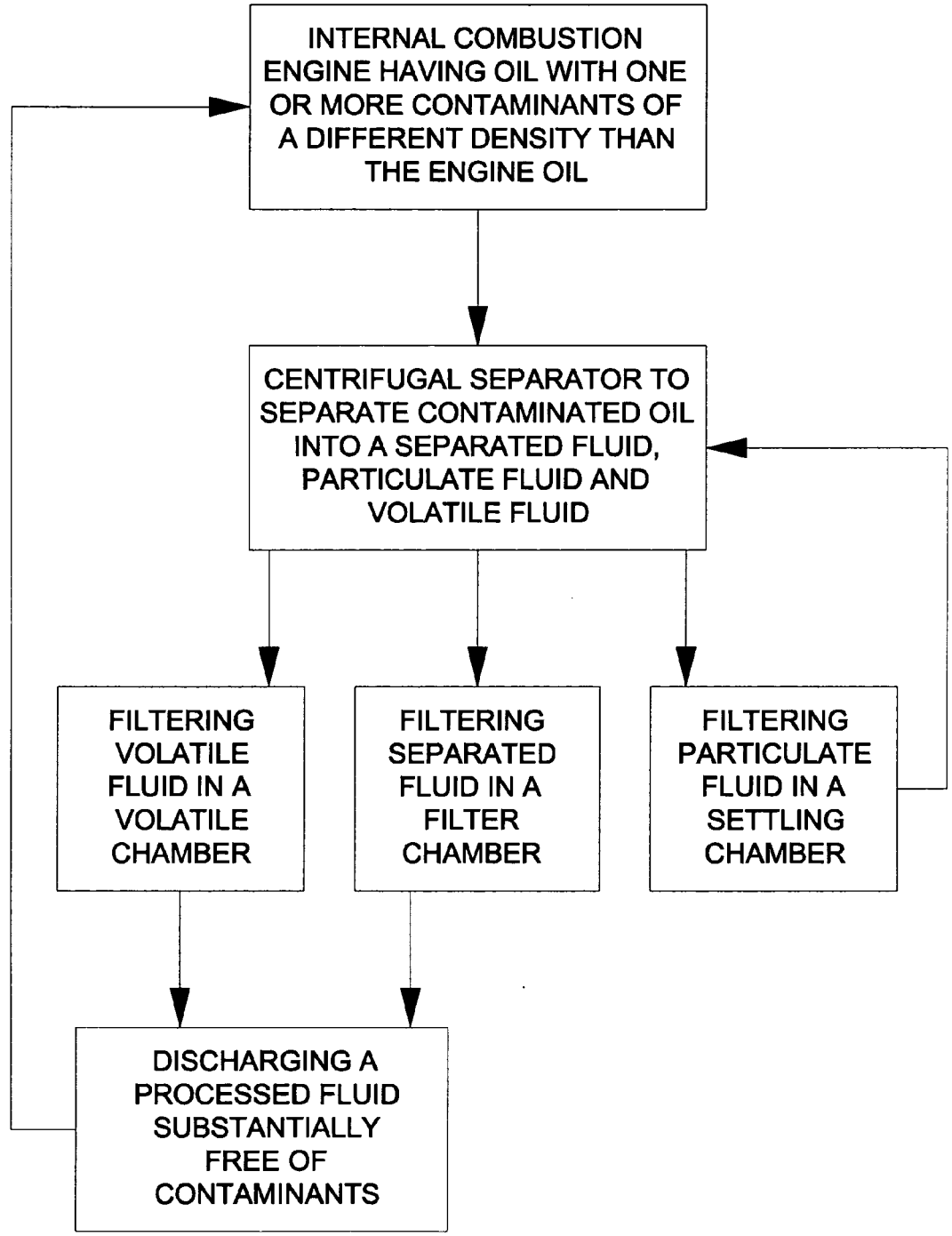
FIG. 9 is a circuit diagram of another embodiment of the present invention for removing volatile, particulate and fluid contaminates from oil used in an internal combustion engine.

As best set forth in FIG. 9, one primary intended use for filter apparatus 10 and the method of the present invention is for purification of oil circulated in an internal combustion engine lubricating system 20 by means of a by-pass on the engine through which oil is pumped under pressure from the crankcase or sump through filter apparatus 10 and then returned to the crankcase or sump independent of the lubricating system 20 of the engine. For ease of explanation, this disclosure will primarily reference use of filter apparatus with internal combustion engine lubricating system 20 utilizing oil as the lubricating fluid to be cleaned.

Figure 2:
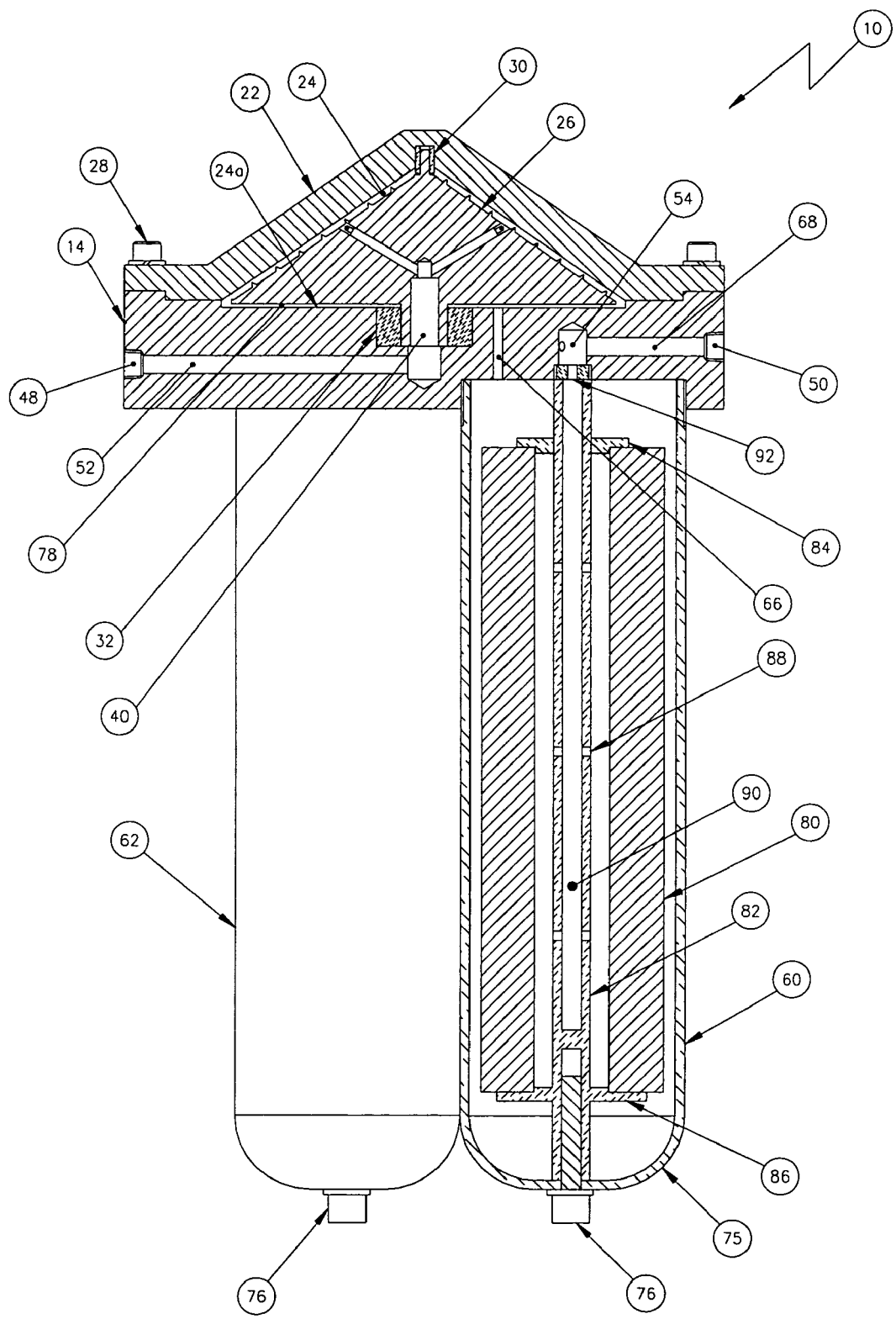
FIG. 2 is a median vertical section in right angle relation to FIG. 1 showing a sectional view of the filter chamber.
Figure 3:
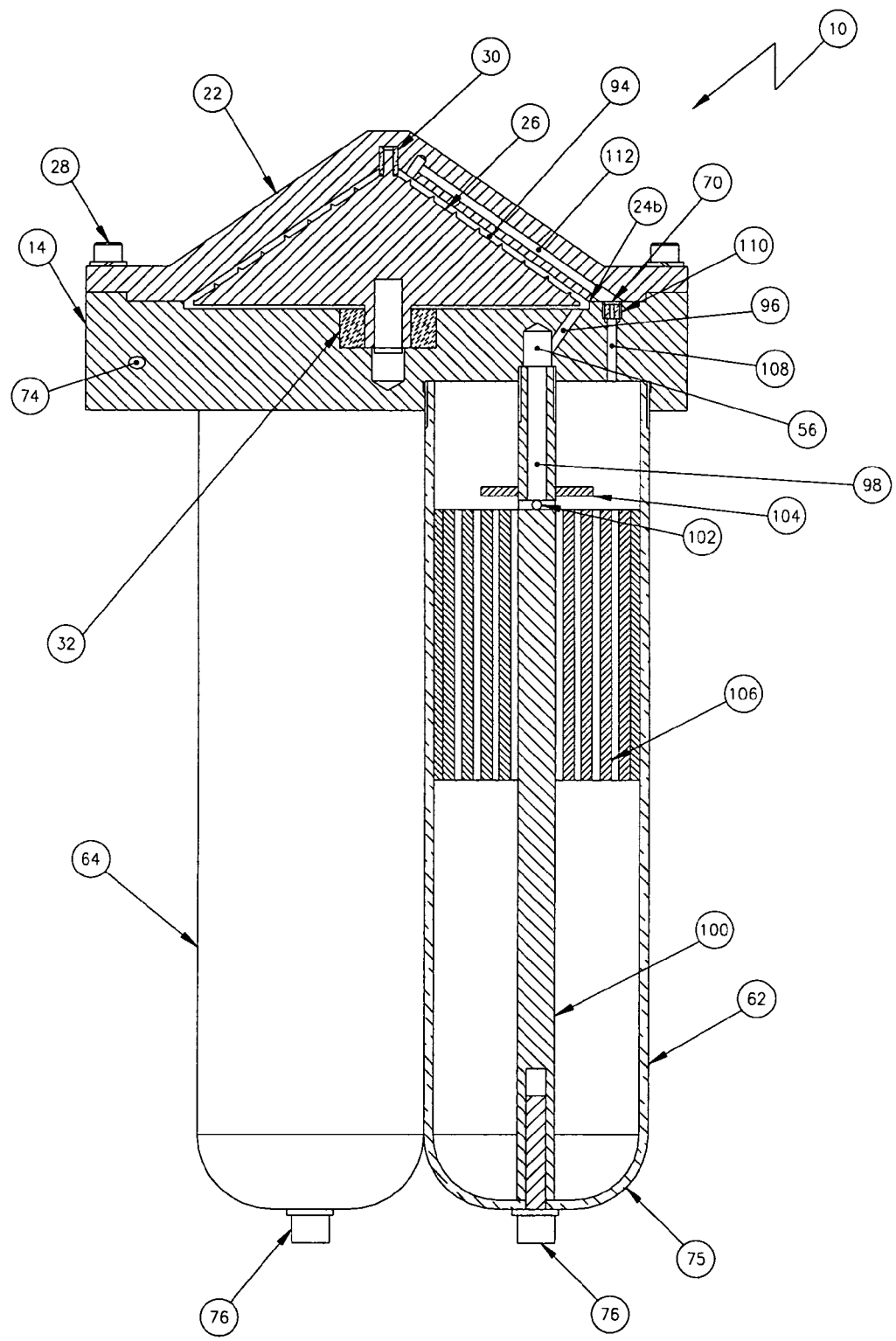
FIG. 3 is a median vertical section in 120° angle relation to FIG. 2 showing a sectional view of the settling chamber.
Figure 4:
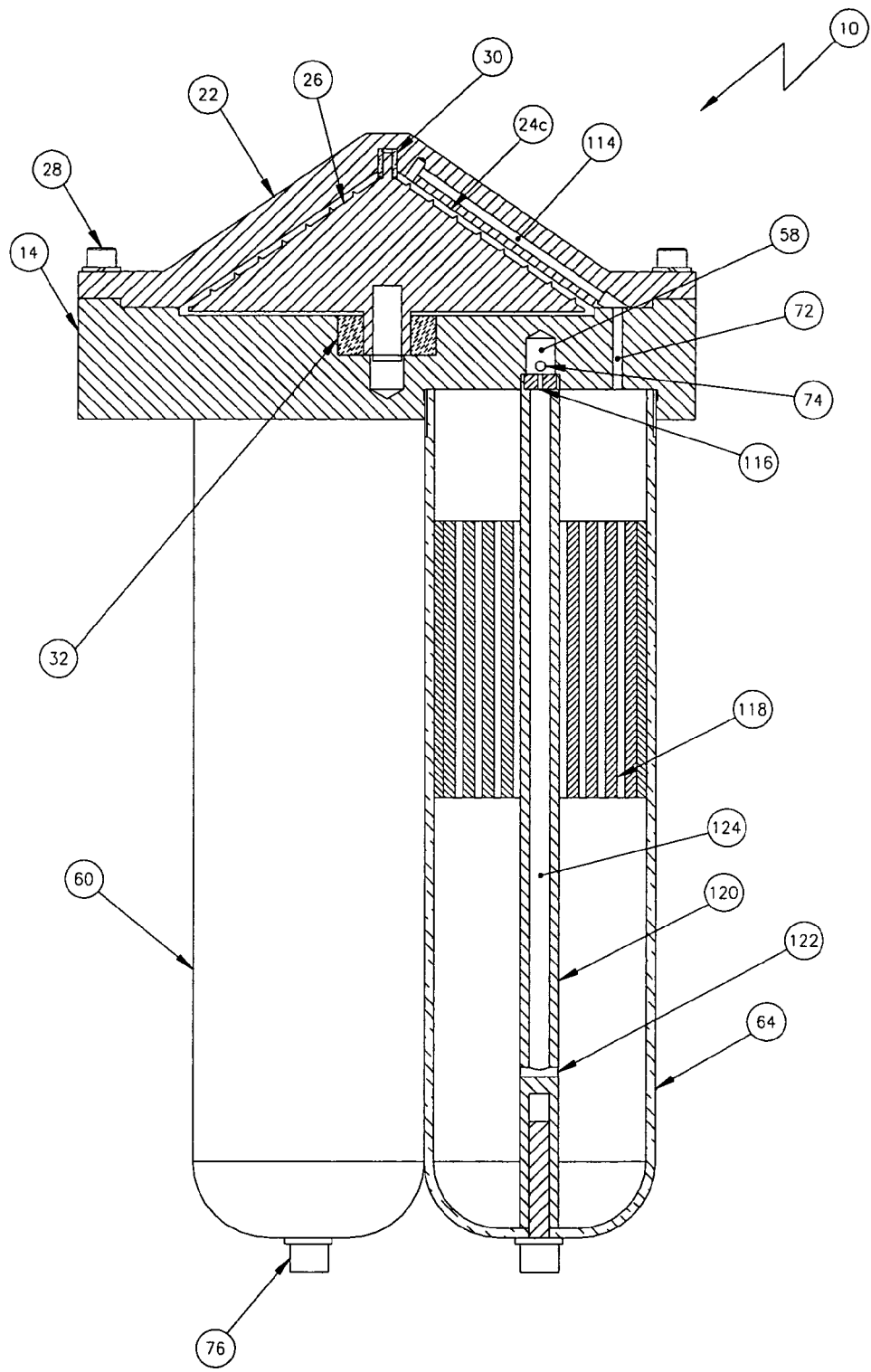
FIG. 4 is a median vertical section in 120° angle relation to FIG. 3 showing a sectional view of the volatile chamber.

Centrifugal separator assembly 12 of filter apparatus 10 has a rotor housing 22 with a rotor chamber 24, having bottom side 24a, outer edge 24b and top side 24c (as shown in FIGS. 2, 3 and 4, respectively), in which rotor 26 rotates substantially about is vertical axis. In the preferred embodiment of filter apparatus 10 of the present invention, centrifugal separator assembly 12 is configured such that when rotor housing 22 is connected to base assembly 14 it forms rotor chamber 24, as shown in FIGS. 2, 3 and 4. In the preferred embodiment, rotor 26 is a jet-propelled helical rotor that rotates due to the pressure supplied by the source of fluid 18 (i.e., the oil pressure in internal combustion engine lubricating system 20). In the embodiment shown in the figures, rotor housing 22 connects to base assembly 14 by use of a plurality of bolts 28, such as the six shown in use, that threadably engage base assembly 14 to tightly hold rotor housing thereon. Other connecting mechanisms, including screws, rivets, adhesives and the like, can be utilized to securely join rotor housing 22 to base assembly 14. Alternatively, rotor housing 24 and base assembly 14 can be configured to have integral locking mechanisms that join these components together by engaging their respective locking mechanisms. Under certain circumstances, it may be possible to form rotor housing 22 and base assembly 14 as a single component. Sealing members, such as gaskets, o-rings or other seals (not shown), can be utilized to seal the connection between rotor housing 22 and base assembly 14. Although a variety of materials can be utilized for rotor housing 22, the preferred material is a metal, such as aluminum, that is sufficiently strong to contain rotor 26.

Figure 6:
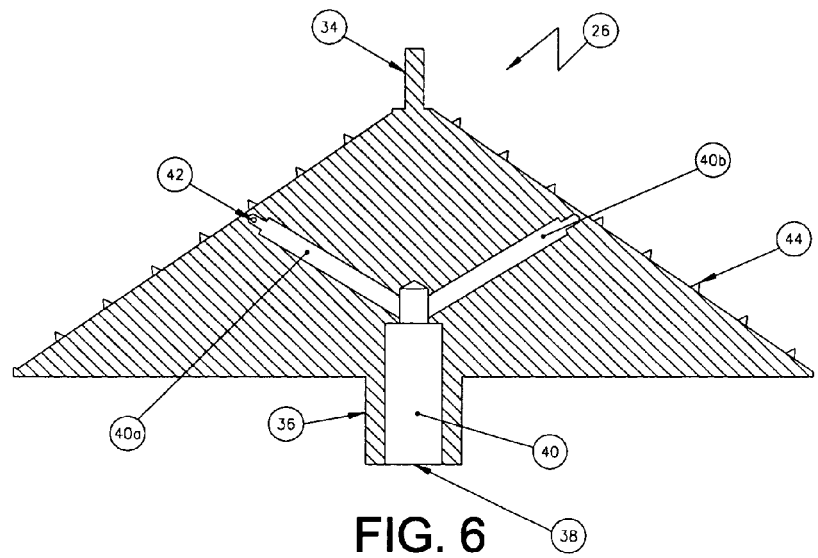
FIG. 6 is a median vertical section of the helical rotor utilized in a preferred embodiment of the present invention.

Rotor 26 is configured to substantially freely rotate inside rotor chamber 24 formed by rotor housing 22. In one configuration, as shown in the figures, rotor chamber 24 and rotor 26 are substantially cone shaped. Rotor chamber 24 has an upper rotor bearing 30 and a lower rotor bearing 32 for rotatably engaging rotor 26 to allow substantially free rotation thereof. In one embodiment, upper rotor bearing 30 is of the needle type and lower rotor bearing 32 is a radial ball bearing. As known to those skilled in the art, other types of bearings can be utilized with rotor 26 of the present invention and any such bearings 30 and 32 can be made out of bearing material such as bronze, Teflon® or any other type of material suitable for rotor 26. As best shown in FIG. 6, rotor 26 has an upper bearing shaft 34 configured to be rotatably received in upper rotor bearing 30 of rotor housing 22 and a lower bearing shaft 36 configured to be rotatably received in lower rotor bearing 32 of rotor housing 22. As well known, upper bearing shaft 34 and lower bearing shaft 36 are positioned substantially on the vertical axis of the cone-shaped rotor 26 to facilitate free and smooth rotation of rotor 26 inside rotor chamber 24. Upper 34 and lower 36 bearing shafts can be made out of a variety of materials consistent with rotatable cooperation with upper 30 and lower 32 rotor bearings. Generally, upper 34 and lower 36 bearing shafts will be made out of a material that is hard and suitable for being made with a smooth surface and high degree of precision. If rotor 26 is made out of aluminum, it could be hard anodized. Upper 34 and lower 36 bearing shafts can be grinded to the desired size and shape or they could be separate components made out of hardened steel or other suitable materials with modifications to rotor 26 so that upper 34 and lower 36 bearing shafts could be pressed, bolted, screwed or otherwise attached to rotor 26.

Figure 7:
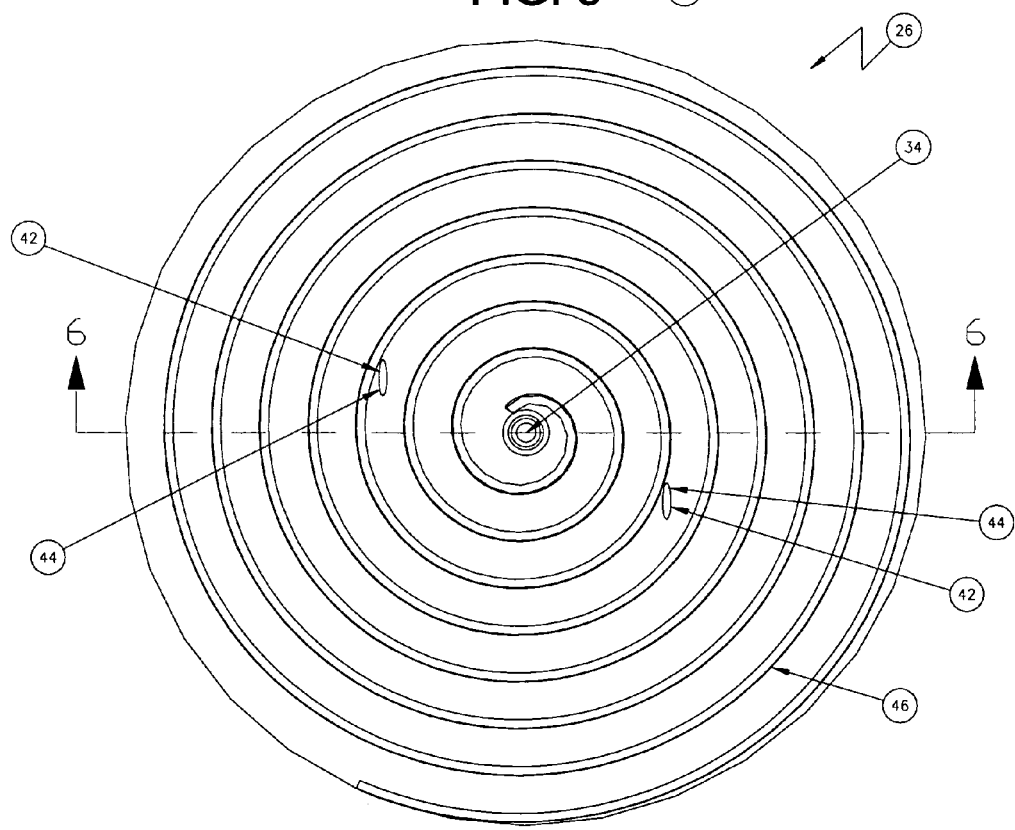
FIG. 7 is a top view of the helical rotor utilized in a preferred embodiment of the present invention.

In the preferred embodiment, pressurized fluid from fluid source 18 enters rotor 26 through rotor inlet 38 at lower bearing shaft 36 and passes through one or more rotor passageways 40 to one or more rotor jets 42, as shown in FIG. 6. Rotor passageway 40 divides into first rotor passageway 40a and second rotor passageway 40b to allow the pressurized oil or other fluid to flow to rotor jets 42, having jet discharge ports 44 facing generally tangent to the vertical axis of rotor 26, so as to cause rotor 26 to rotate or spin about its vertical axis on upper rotor bearing 30 and lower rotor bearing 32. Jet discharge ports 44 have a reduced diameter to intensify the velocity of oil be discharged from rotor jets 42 so as to facilitate rotation or spinning of rotor 26 on its vertical axis between upper 30 and lower 32 rotor bearings. In the preferred embodiment, rotor 26 also has a helically shaped wiper 46 configured to impart a dredging action and to facilitate spinning of the fluid (i.e., oil) in rotor chamber 24 such that as rotor 26 spins, the centrifugal force separates the fluid into a separated fluid and one more classes of contaminated fluids, such as particulate fluid and volatile fluid. The particulate fluid comprises liquids and heavier particulate matter, with a certain amount of fluid/oil, that were forced to the outer portion of rotor housing 24 by centrifugal force. The volatile fluid comprises the lighter, volatile materials, with a certain amount of fluid/oil, which rise and migrate to the center of rotor 26 and top of rotor chamber 24. As described below, the contaminates are then removed from the fluid before discharging the clean or processed fluid back to the fluid source 18. The one or more rotor passageways 40, such as first 40a and second 40b rotor passageways, can be drilled prior to forming the helically shaped wiper 46 and then plugged by welding or other mechanism. The helical wiper 46 can be formed by a CNC machine with a C axis and should have a pitch size and shape somewhat as shown in FIGS. 6 and 7. Other shaped configurations for wiper 46 may also provide the desired dredging and spinning action on the fluid. Rotor jets 42 can be drilled tangent to the radius of rotor 26. The size of jet discharge ports 44 for rotor jets 42 is determined by the restriction at the source of oil, which will be 80% combined. Jet discharge ports 44 and rotor jets 42 should be sized and configured to facilitate the rotation or spinning of rotor 26 in rotor chamber 24 so as to separate the heavier contaminants and volatile materials from the fluid being cleaned.

Figure 5:
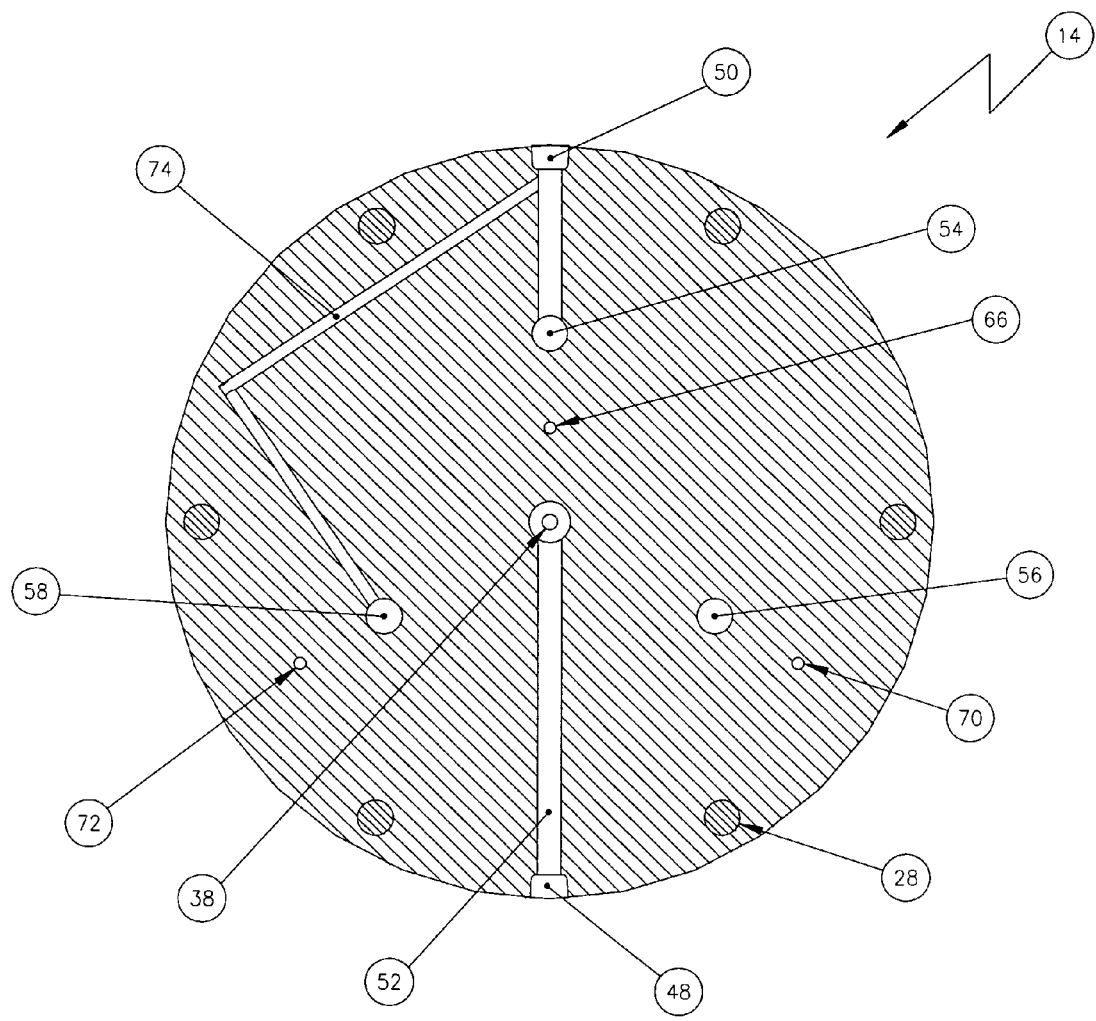
FIG. 5 is a section view of the base assembly taken on the center of the inlet and outlet porting.

As shown in FIGS. 1, 2 and 5, base assembly 14 has a base inlet port 48 configured to connect to a tubular or other member (not shown) that connects to fluid source 18 and a base outlet port 50 configured to connect to a tubular or other member to discharge clean, processed fluid generally back to fluid source 18. In one configuration, inlet port 48 and base outlet port 50 have a threaded fitting suitable for cooperatively receiving a threaded end of a tubing, hose, pipe or other tubular member. When used with internal combustion engine lubricating system 20, oil under pressure enters inlet port 48 and flows along inlet channel 52 to rotor inlet 38, as best shown in FIG. 5, where it will flow to rotor jets 42 to rotate rotor 26, as described above. Bolts 28 connect rotor housing 22 to base assembly 14. As will be described in more detail below and shown in FIG. 5, base assembly 14 comprises one or more chamber ports, such as filter chamber port 54, settling chamber port 56 and volatile chamber port 58 for connecting one or more chambers, such as filter chamber 60, settling chamber 62 and volatile chamber 64, to base assembly 14 and rotor assembly 12. Base assembly 14 also has a filter chamber inlet port 66, filter chamber discharge channel 68 interconnecting filter chamber port 54 and base outlet port 50, settling chamber discharge port 70, volatile chamber inlet 72 and a volatile chamber discharge channel 74 interconnecting volatile chamber port 58 and filter chamber discharge channel 68, as shown in FIG. 5, or base outlet port 50. As described below, these various components interact to remove contaminants in fluid from fluid source 18 and discharge clean, processed fluid back to fluid source 18 or to other locations as desired.

In the preferred embodiment, chamber assembly 16 of filter apparatus 10 has three separate chambers for receiving and filtering three different types of contaminants. The preferred embodiment utilizes separate tanks for forming chambers 60, 62 and 64. As known to those skilled in the art, chamber assembly 16 can consist of one tank having multiple, distinct chambers (i.e., chambers 60, 62 and 64) therein. Chambers 60, 62 and 64 are configured to generally receive and filter out contaminants from the fluid, such as oil, after the fluid is acted upon by centrifugal separator assembly 12. As shown in FIGS. 1 through 4 and explained in more detail below, collection chambers or tanks 60, 62 and 64 removably attach to base assembly 14 and have removable bottom sections 75 that are held in place by bolts 76 at the bottom thereof.

Filter chamber/tank 60, best shown in FIG. 2, is configured to receive fluid from rotor assembly 12 and filter out the medium level contaminants (i.e., the contaminants not separated by rotor assembly 12). As rotor 26 spins, the heavier contaminants are forced to the outermost portion of rotor chamber 22. A spacer or other such device (not shown) maintains a lower gap 78 in rotor chamber 24 between the bottom of rotor 26 and the top of base assembly 14. The fluid/oil that has the fewest contaminants, referred to as the separated fluid, in it will resist the centrifugal force from rotor 26 and flow through lower gap 78 to filter chamber inlet 66 and then inside filter chamber 60. Inside filter chamber 60, the separated fluid will pass, in a generally horizontal direction, through first filter 80. First filter 80 is held in place by filter chamber tube 82 that is threaded into base assembly 14 at filter chamber port 54 with upper filter flange 84 and lower filter flange 86 that are threaded, pinned or welded into place inside filter chamber 60. After passing through first filter 80, the separated fluid/oil will pass through filter tube ports 88 into the inner channel 90 of filter chamber tube 82. A flow restrictor 92 placed in or before filter chamber port 54 is utilized to restrict the processed fluid passing through base outlet port 50, which is connected to the sump of the engine in the same manner as base inlet port 48.

In a preferred embodiment, filter chamber 60 is a tank that is removable from base assembly 14 by disengaging filter chamber tube 82 from filter chamber port 54. Once filter chamber 60 is separated from base assembly 14, first filter 80 and filter chamber tube 82 can be removed from filter chamber 60 by disengaging bolt 76 so that first filter 80 may be cleaned or replaced. At the same time, the inside of filter chamber 60 can also be cleaned. Alternatively, the entire filter chamber 60, with all of its internal components, can be replaced. In another alternative embodiment, where the shell of filter chamber 60 is fixedly attached to base assembly 14, disengaging bolt 76 allows the user to remove bottom section 75 from filter chamber 60 and disengage filter chamber tube 82 from filter chamber port 54 so that first filter 80 can be removed, with or without filter chamber tube 82, for cleaning or replacement.

Settling chamber/tank 62, best shown in FIG. 3, is configured to receive and filter fluid, referenced as the particulate fluid, having the highest concentrations of contaminants and under the highest pressure in filter apparatus 10 due to the centrifugal force of rotor 26. The particulate fluid is forced against the inner walls of rotor housing 22 by the centrifugal force of rotor 26 to flow down upper gap 94 to settling chamber port 56 through settling chamber inlet passageway 96. The particulate fluid/oil then flows through the inner channel 98 of the settling chamber tube 100 that is removably attached to base assembly 14, by threads or other mechanisms. The particulate fluid then exits inner channel 98 through one or more tube discharge ports 102 to the interior of settling chamber 62. In one embodiment, four discharge ports 102 are utilized. This fluid is forced into a horizontal flow by a baffle flange 104 so as to flow horizontally over the second filter 106, which can comprise a vertical settling grid, that is pressed over settling chamber tube 100 and securely held in position either by press-fit glue, pins or other mechanism. The lighter oil, relative to the heavier particulate matter, is then drawn through settling chamber outlet passageway 108 as a result of the lower pressure created by the centrifugal force of rotor 26. Restrictor 110 in passageway 108 facilitates the settling of contaminants below second filter 106 by reducing fluid flow out of settling chamber 62. The fluid then flows through first rotor housing channel 112 and reintroduced to rotor chamber 24 to be processed again. Because some of the heavier contaminants have been removed from the fluid, some or all of the fluid being reprocessed will be included with the fluid exiting centrifugal separator assembly 12 to filter chamber/tank 60 as described above. The fluid still having heavy contaminants will again pass through settling chamber 62 as described herein.

In a preferred embodiment, settling chamber 62 is a tank that is removable from base assembly 14 by disengaging settling chamber tube 100 from settling chamber port 56. Once settling chamber 62 is separated from base assembly 14, second filter 106 and settling chamber tube 100 can be removed from settling chamber 62 by disengaging bolt 76 so that second filter 106 may be cleaned or replaced. At the same time, the inside of settling chamber 62 can also be cleaned. Alternatively, the entire settling chamber 62, with all of its internal components, can be replaced. In another alternative embodiment, where the shell of settling chamber 62 is fixedly attached to base assembly 14, disengaging bolt 76 allows the user to remove bottom section 75 from settling chamber 62 and disengage settling chamber tube 100 from settling chamber port 56 so that second filter 106 can be removed, with or without settling chamber tube 100, for cleaning or replacement.

Volatile chamber/tank 64, best shown in FIG. 4, is for retrieving and filtering fluid having volatile materials therein, referred to as volatile fluids. Due to flow restrictor 92, shown in FIG. 2, filter apparatus 10 of the present invention maintains a small amount of pressure in it. This pressure allows for volatiles and other contaminants that are lighter in specific gravity than the fluid/oil to be forced with the fluid/oil into second rotor housing channel 114 that opens into rotor chamber 24 at or near the top (i.e., the apex in the preferred conical-shape of rotor chamber 24). From second rotor housing channel 114, the volatile fluid travels through volatile inlet 72 into the interior of the volatile chamber/tank 64. In the preferred embodiment, the flow of the volatile fluid/oil is slowed by flow restrictor 116 in volatile chamber port 58, thereby allowing the heavier oil, relative to the volatile materials in the volatile fluid, to be drawn down through the third filter or volatile grid 118, which is attached to volatile chamber tube 120 that is threaded into the volatile chamber port 58 in the same manner as the second filter/settling grid 106 shown in FIG. 3, creating minimal turbulence within volatile chamber 64. Volatile chamber/tank 64 allows the volatiles and other lighter contaminants to remain at the top of volatile chamber 64. The oil portion of the fluid in volatile chamber 64 moves through volatile tube port 122 at or near the bottom of volatile chamber 64 and into volatile chamber tube channel 124 inside volatile chamber tube 120. The fluid passes through flow restrictor 116 and volatile chamber port 58 and into volatile chamber discharge channel 74. As shown in FIG. 5, the fluid flows from volatile chamber discharge channel 74 to filter chamber discharge channel 68 to be mixed with the other processed fluid/oil and returned to the engine oil sump through base outlet port 50. Alternatively, volatile chamber discharge channel 74 can connect directly with base outlet port 50 for return to the oil sump.

In a preferred embodiment, volatile chamber 64 is a tank that is removable from base assembly 14 by disengaging volatile chamber tube 120 from volatile chamber port 58. Once volatile chamber 64 is separated from base assembly 14, third filter 118 and volatile chamber tube 120 can be removed from volatile chamber 64 by disengaging bolt 76 so that third filter 118 may be cleaned or replaced. At the same time, the inside of volatile chamber 64 can also be cleaned. Alternatively, the entire volatile chamber 64, with all of its internal components, can be replaced. In another alternative embodiment, where the shell of volatile chamber 64 is fixedly attached to base assembly 14, disengaging bolt 76 allows the user to remove bottom section 75 from volatile chamber 64 and disengage volatile chamber tube 120 from volatile chamber port 58 so that third filter 118 can be removed, with or without volatile chamber tube 120, for cleaning or replacement.

The vertical settling grids of second filter 106 and third filter 118 are generally characterized by having a plurality of vertically extending slender passageways, thereby providing a mechanism to withdraw sinking or rising contaminants from the fluid/oil. This further enhances the separation of contaminants from the fluid/oil before returning it to circulation from the settling chamber 62 or the volatile chamber 64. An ideal material for second filter 106 and third filter 118 is commonly available commercially as a honeycomb of hexagonal walls that is available in various thicknesses.

Tank tubes 82, 100 and 120 can be made out of solid bronze rod that is threaded, tapped, drilled and ported. Tubing could be used provided if it is plugged in the proper places. Steel or aluminum could also be used considering the strength of the material and adjusting the size as necessary to compensate.

Various materials can be utilized for the various components of filter apparatus 10 of the present invention. For instance, rotor housing 22 and base assembly 14 can be constructed from billet aluminum. Other materials, such as injected molded plastic, billet or cast steel or the like could be utilized but are generally not preferred due to their thermal properties. Chambers or tanks 60, 62 and 64 can be made from aluminum tubing formed by spinning or cast machining. Other materials, such as molded plastic, steel that has been hydro-formed or processed similarly to aluminum, can be used for chambers/tanks 60, 62 and 64. As with the other components, one of the primary considerations is the thermal properties of the materials selected. Aluminum is preferred due primarily to the balance of cost, weight and ability to transfer heat. By transferring heat out filter apparatus 10, particularly chamber assembly 16, and passing the fluid through the various filters, ports and channels, the filter apparatus 10 provides additional cooling for the fluid before it is returned to its source.

In use, a tubular member (not shown), or other mechanism suitable for allowing fluid to flow to filter apparatus 10, connects the high-pressure side of the lubricating system 20 of an internal combustion engine, or other fluid source 18, with inlet 48 on base assembly. The flow will be restricted at that point to a safe level so as not to interfere with normal operation of the engine lubricating system 20. In one embodiment, oil will flow from the internal combustion engine's lubricating system 20 under pressure, through base inlet channel 52 to rotor inlet 38, through rotor passageway 40 and then split into passageways 40a and 40b to rotor jets 42. Because rotor jets 42 are directed generally tangent to the vertical axis of rotor 26 and have a reduced diameter discharge port 44, the velocity of the oil being discharged from rotor jet is intensified, causing rotor 26 to spin in a direction opposite that of discharge ports 44 of rotor jets 42 (i.e., clockwise in the embodiment shown in FIG. 6). Rotor 26 will spin on its vertical axis between upper bearing shaft 34 in upper rotor bearing 30 and lower bearing shaft 36 in lower rotor bearing 32.

As rotor 26 spins, wiper 46 imparts a dredging action and spins the oil, causing heavier particulate matter and liquids to be forced to the outer and lower portions of rotor housing 22 and the lighter volatile materials to rise and migrate to the center of rotor 26. The portion of the oil separated from the volatiles and heaver particulate matter will flow to filter chamber 60 through lower gap 78 and filter channel inlet 66 to the inside of filter channel 60, as best shown in FIG. 2. The fluid then flows through first filter 80, into inner channel 90 and then to filter chamber port 54 past flow restrictor 92. From filter chamber port 54, the processed fluid flows through filter chamber discharge channel 68 and base outlet port 50 to the engine's sump. Fluid having heavier particulate matter is thrown against the inner wall of rotor chamber 24 and flows through settling chamber inlet passageway 96 to settling chamber port 56, and then to inner channel 98 of settling chamber tube 100, as best shown in FIG. 3. Baffle flanges 104 above tube discharge ports 102 causes the fluid to flow horizontally across the top of second filter 106. The heavy contaminates flow down past second filter 106 while the lighter oil is drawn up into settling chamber outlet passageway 108 past restrictor 110 to first rotor housing channel 112, where it is directed back into rotor chamber 24 for reprocessing. The lighter volatile materials exit rotor chamber 24 through second rotor housing channel 114 to volatile chamber inlet port 72 and into volatile chamber 64, as best shown in FIG. 4. The volatile materials remain at the top of volatile chamber 64 while the heavier oil flows through third filter 118 to remove any remaining contaminants. The oil flows through volatile tube port 122 into volatile tank tube channel 124 and past flow restrictor 116 into volatile chamber port 58, from where it flows through volatile chamber discharge channel 74 to base outlet port 50.

While there are shown and described herein certain specific alternative forms of the invention, it will be readily apparent to those skilled in the art that the invention is not so limited, but is susceptible to various modifications and rearrangements in design and materials without departing from the spirit and scope of the invention. For instance, it should be noted that the present invention is subject to modification with regard to the dimensional relationships set forth herein and modifications in assembly, materials, size, shape and use. In particular, the apparatus and method are adaptable to a variety of different size and configurations of chambers and/or tanks and filters disposed inside those chambers/tanks. The apparatus and method can be utilized with a variety of different fluids to remove liquid, volatile, particulate and other contaminants of a different density than the desired fluid.

What is claimed is:

1. A filter apparatus for filtering contaminants from a fluid, said filter apparatus comprising:
    an inlet on said filter apparatus configured to receive said fluid into said filter apparatus;
    a centrifugal separator hydraulically connected to said inlet, said centrifugal separator having a rotor housing forming a rotor chamber and a rotor rotatably disposed inside said rotor chamber, said centrifugal separator configured to separate said fluid into a separated fluid and one or more classes of contaminated fluids;
    a chamber assembly having at least a first chamber for receiving and filtering said separated fluid and a second chamber for receiving and filtering at least one of said one or more classes of contaminated fluids to obtain a processed fluid, each of said first chamber and said second chamber having a filter element disposed therein;
    a base assembly interconnecting said centrifugal separator and said chamber assembly, said base assembly configured to selectively direct said separated fluid into said first chamber and said one or more classes of contaminated fluids to said second chamber; and
    an outlet on said filter apparatus configured to discharge said processed fluid from said filter apparatus.

2. The filter apparatus according to claim 1 further comprising one or more bearing assemblies configured to permit rotation of said rotor relative to said rotor housing, each of said bearing assemblies having a shaft member disposed in a rotor bearing.

3. The filter apparatus according to claim 1, wherein said rotor and said rotor housing are generally cone shaped.

4. The filter apparatus according to claim 3, wherein said rotor is configured with a generally helical wiper.

5. The filter apparatus according to claim 4, wherein said fluid is supplied from a source of pressurized fluid and said rotor is configured with one or more rotor jets in fluid communication with said source of pressurized fluid, said one or more rotor jets configured to rotate said rotor in said rotor housing.

6. The filter apparatus according to claim 1, wherein said fluid is supplied from a source of pressurized fluid and said rotor is configured with one or more rotor jets in fluid communication with said source of pressurized fluid, said one or more rotor jets configured to rotate said rotor in said rotor housing.

7. The filter apparatus according to claim 1, wherein said rotor housing has one or more channels in hydraulic communication with said chamber assembly.

8. The filter apparatus according to claim 7, wherein said rotor housing has a first rotor housing channel and said chamber assembly has a settling chamber, said first rotor housing channel hydraulically interconnecting said rotor chamber and said settling chamber, said first rotor housing channel hydraulically connected at or near the bottom of said rotor chamber.

9. The filter apparatus according to claim 8, wherein said rotor housing has a second rotor housing channel and said chamber assembly has a volatile chamber, said second housing channel hydraulically interconnecting said rotor chamber and said volatile chamber, said second rotor housing channel hydraulically connected at or near the top of said rotor chamber.

10. The filter apparatus according to claim 1, wherein said chamber assembly comprises a filter chamber, a settling chamber and a volatile chamber and said one or more classes of contaminated fluids comprises a particulate fluid and a volatile fluid, each of said filter chamber, said settling chamber and said volatile chamber having a filter element disposed therein, said filter chamber configured to receive said separated fluid from a bottom side of said rotor chamber and filter said separated fluid, said settling chamber configured to receive said particulate fluid from an outer edge of said rotor chamber and filter said particulate fluid, said volatile chamber configured to receive said volatile fluid from a top side of said rotor chamber and filter said volatile fluid.

11. The filter apparatus according to claim 10, wherein each of said filter chamber and said volatile chamber are hydraulically connected to said outlet and said settling chamber is hydraulically connected to said top side of said rotor chamber.

12. The filter apparatus according to claim 10, wherein said filter element in said settling chamber is configured for generally vertical filtering of said particulate fluid and said filter element in said volatile chamber is configured for generally vertical filtering of said volatile fluid.

13. The filter apparatus according to claim 12, wherein said chamber assembly is configured to store particulate matter in said settling chamber and store volatile material in said volatile chamber.

14. The filter apparatus according to claim 10 further comprising a flange in said settling chamber, said flange positioned above said filter element and configured to direct the flow of said particulate fluid to said filter element.

15. The filter apparatus according to claim 10, wherein each of said filter chamber, said settling chamber and said volatile chamber are removably connected to said base assembly.

16. The filter apparatus according to claim 10, wherein said filter elements in said settling chamber and said volatile chamber are configured to reduce or eliminate turbulence therein.

17. The filter apparatus according to claim 1, wherein at least one of said first chamber and said second chamber are removably connected to said base assembly.

18. The filter apparatus according to claim 1, wherein each of said first chamber and said second chamber have a bottom section removably attached thereto for access to the interior thereof.

19. The filter apparatus according to claim 1, wherein at least one of said filter element in said first chamber and said second chamber are configured to reduce or eliminate turbulence therein.

20. The filter apparatus according to claim 1 further comprising one or more flow restrictors in said base assembly.

21. The filter apparatus according to claim 1, wherein said chamber assembly comprises one or more tanks, said one or more tanks forming said first chamber and said second chamber.

22. A filter apparatus for filtering contaminants from a pressurized fluid, said filter apparatus comprising:
an inlet on said filter apparatus configured to receive said pressurized fluid into said filter apparatus;
a centrifugal separator hydraulically connected to said inlet, said centrifugal separator having a rotor housing forming of a rotor chamber and a rotor rotatably disposed inside said rotor chamber, said centrifugal separator configured to separate said pressurized fluid into a separated fluid, a particulate fluid and a volatile fluid, said rotor having one or more rotor jets configured to discharge said pressurized fluid so as to rotate said rotor in said rotor housing;
a chamber assembly having a filter chamber, a settling chamber and a volatile chamber, each of said filter chamber, said settling chamber and said volatile chamber having a filter element disposed therein, said filter chamber configured to receive said separated fluid from a bottom side of said rotor chamber, said settling chamber configured to receive said particulate fluid from an outer edge of said rotor chamber, said volatile chamber configured to receive said volatile fluid from a top side of said rotor chamber;
a base assembly interconnecting said centrifugal separator and said chamber assembly, said base assembly configured to selectively direct said separated fluid into said filter chamber, said particulate fluid into said settling chamber and said volatile fluid into said volatile chamber; and
an outlet on said filter apparatus.

23. The filter apparatus according to claim 22 further comprising one or more bearing assemblies configured to permit rotation of said rotor relative to said rotor housing, each of said bearing assemblies having a shaft member disposed in a rotor bearing.

24. The filter apparatus according to claim 22, wherein said rotor and said rotor housing are generally cone shaped.

25. The filter apparatus according to claim 22, wherein said rotor is configured with a generally helical wiper.

26. The filter apparatus according to claim 22, wherein said rotor housing has one or more channels in hydraulic communication with said chamber assembly.

27. The filter apparatus according to claim 26, wherein said rotor housing has a first rotor housing channel hydraulically interconnecting said rotor chamber and said settling chamber.

28. The filter apparatus according to claim 27, wherein said rotor housing has a second rotor housing channel hydraulically interconnecting said rotor chamber and said volatile chamber.

29. The filter apparatus according to claim 22, wherein each of said filter chamber and said volatile chamber are hydraulically connected to said outlet and said settling chamber is hydraulically connected to said top side of said rotor chamber.

30. The filter apparatus according to claim 22, wherein said filter element in said settling chamber is configured for generally vertical filtering of said particulate fluid and said filter element in said volatile chamber is configured for generally vertical filtering of said volatile fluid.

31. The filter apparatus according to claim 30, wherein said chamber assembly is configured to store particulate matter in said settling chamber and store volatile material in said volatile chamber.

32. The filter apparatus according to claim 22 further comprising a flange in said settling chamber, said flange positioned above said filter element and configured to direct the flow of said particulate fluid to said filter element.

33. The filter apparatus according to claim 22, wherein each of said filter chamber, said settling chamber and said volatile chamber are removably connected to said base assembly.

34. The filter apparatus according to claim 22, wherein said filter elements in said settling chamber and said volatile chamber are configured to reduce or eliminate turbulence therein.

35. The filter apparatus according to claim 22 further comprising one or more flow restrictors in said base assembly.

36. A method of filtering contaminates in a lubricating fluid from an engine lubricating system, said method comprising the steps of:
  (a) receiving said lubricating fluid into a filter apparatus;
  (b) separating said lubricating fluid with a centrifugal separator into a separated fluid, a particulate fluid and a volatile fluid, said centrifugal separator having a rotor rotatably disposed in a rotor chamber, said rotor having one or more rotor jets in communication with said source of pressurized fluid and configured to rotate said rotor in said rotor chamber;
  (c) directing said separated fluid to a filter chamber, said particulate fluid to a settling chamber and said volatile fluid to a volatile chamber;
  (d) filtering said separated fluid, said particulate fluid and said volatile fluid to obtain a processed fluid; and
  (e) discharging said processed fluid to said source of fluid.

37. The method of claim 36, wherein said rotor is conically-shaped and configured with a generally helical wiper.

38. The method of claim 36 further comprising the step of returning at least a portion of said processed fluid to said centrifugal separator after said filtering step to repeat steps (b) through (d).

39. The method of claim 36, wherein said filtering step is accomplished with a filter element disposed in each of said filter chamber, said settling chamber and said volatile chamber.

40. The method of claim 36, wherein said filter chamber is configured to receive said separated fluid from a bottom side of said rotor chamber, said settling chamber is configured to receive said particulate fluid from an outer edge of said rotor chamber, said volatile chamber is configured to receive said volatile fluid from a top side of said rotor chamber.

41. The method of claim 36, wherein at least one of said filter chamber, said settling chamber and said volatile chamber is removably connected to said filter apparatus.

42. The method of claim 36, wherein said directing step is accomplished with a base assembly disposed between said centrifugal separator and said filter chamber, said settling chamber and said volatile.

43. The method of claim 42, wherein said base assembly comprises one or more channels, one or more ports and one or more flow restrictors.

44. The method of claim 36, wherein said lubricating fluid is oil.

45. The method of claim 44, wherein said engine lubricating system is used with an internal combustion engine.

* * * * *